(12) United States Patent
Kelly

(10) Patent No.: US 6,767,171 B2
(45) Date of Patent: Jul. 27, 2004

(54) RECREATIONAL VEHICLE LOADING AND UN-LOADING APPARATUS

(76) Inventor: Jake Edward Kelly, 21 Connaught Ave, London Ontario (CA), N5Y 3A4

( * ) Notice: Subject to any disclaimer, the term of this patent is extended or adjusted under 35 U.S.C. 154(b) by 15 days.

(21) Appl. No.: 10/260,554

(22) Filed: Oct. 1, 2002

(65) Prior Publication Data

US 2004/0062629 A1 Apr. 1, 2004

(51) Int. Cl.[7] ................................................. B60P 9/00
(52) U.S. Cl. ...................... 414/462; 414/475; 414/480; 414/917
(58) Field of Search ............................... 414/462, 469, 414/474, 475, 476, 480, 486, 576, 917

(56) References Cited

U.S. PATENT DOCUMENTS

| | | | | |
|---|---|---|---|---|
| 2,676,720 A | * | 4/1954 | Noble .......................... | 414/462 |
| 3,612,366 A | * | 10/1971 | Schneider et al. ........... | 414/462 |
| 3,737,055 A | * | 6/1973 | Pettit ........................... | 414/558 |
| 4,395,187 A | * | 7/1983 | Corley, Jr. ................... | 414/557 |
| 4,932,829 A | | 6/1990 | Miller | |
| 4,941,797 A | * | 7/1990 | Smillie, III ................... | 414/462 |
| 5,253,973 A | * | 10/1993 | Fretwell ....................... | 414/558 |
| 5,262,706 A | * | 11/1993 | Hollingsworth .............. | 318/560 |
| 5,354,164 A | * | 10/1994 | Goss et al. ................... | 414/462 |
| 5,380,141 A | | 1/1995 | Flowers | |
| 5,393,191 A | | 2/1995 | Alexander | |
| 5,603,600 A | | 2/1997 | Egan et al. | |
| 5,622,299 A | * | 4/1997 | Berard ......................... | 224/403 |
| 5,800,115 A | * | 9/1998 | Fenton ......................... | 414/477 |
| 5,810,546 A | * | 9/1998 | Schmoling ................... | 414/538 |
| 5,816,767 A | * | 10/1998 | Mann ........................... | 414/537 |
| 5,829,945 A | | 11/1998 | Stanley | |
| 5,897,284 A | * | 4/1999 | Ardohain ...................... | 414/522 |
| 5,899,466 A | * | 5/1999 | Twaits, Jr. ................... | 280/47.18 |
| 6,152,674 A | | 11/2000 | Ogrodnick | |
| 6,164,895 A | * | 12/2000 | Croswell ...................... | 414/462 |
| 6,176,672 B1 | | 1/2001 | Egan et al. | |
| 6,183,187 B1 | * | 2/2001 | Ablabutyan .................. | 414/558 |
| 6,234,741 B1 | * | 5/2001 | McDaniel ..................... | 414/546 |
| 6,296,290 B1 | * | 10/2001 | Wolf ............................. | 296/61 |
| 6,318,929 B1 | * | 11/2001 | Basta ............................ | 405/3 |
| 6,345,693 B1 | * | 2/2002 | Yeo et al. ..................... | 187/211 |
| 6,357,991 B1 | * | 3/2002 | Hamlett ........................ | 414/538 |
| 6,390,761 B1 | | 5/2002 | Palmer, Jr. et al. | |
| 6,413,033 B1 | | 7/2002 | Monroig, Jr. | |
| 6,457,931 B1 | * | 10/2002 | Chapman ...................... | 414/491 |
| 6,592,319 B2 | * | 7/2003 | Berger .......................... | 414/522 |

OTHER PUBLICATIONS

Brochure for EZ Sled Loader by Cycle Hauler, downloaded from www.cyclehauler.com on Sep. 27, 2002.

* cited by examiner

*Primary Examiner*—Douglas Hess
(74) *Attorney, Agent, or Firm*—Anissimoff & Associates; Robert A. H. Brunet

(57) ABSTRACT

An apparatus for loading and un-loading a recreational vehicle from a truck. The truck has a front and rear and a longitudinal axis defined therebetween. The apparatus comprises, in one embodiment, a vehicle receiving ramp and a lifting mechanism engaged with the underside of the ramp. The lifting mechanism is mounted to the rear of the truck and is selectively operable to arcuately move the ramp between a lowered position that is inclined with respect to the longitudinal axis and a raised position that is parallel with the longitudinal axis. The ramp is longitudinally mobile in the raised position between a foremost and rearmost position and is selectively lockable in the foremost and rearmost positions using a locking mechanism. To load the recreational vehicle, the ramp is preferably locked in the rearmost longitudinal position and placed in the lowered position for receiving the vehicle. The ramp with the vehicle is then raised using the lifting mechanism, unlocked from the rearmost longitudinal position, longitudinally moved to the foremost longitudinal position, and locked again using the locking mechanism.

20 Claims, 4 Drawing Sheets

RECREATIONAL VEHICLE LOADING AND UN-LOADING APPARATUS

FIELD OF THE INVENTION

The invention relates to the loading and un-loading of recreational vehicles on to a truck. More particularly, the invention relates to an inclined vehicle receiving ramp that may be raised with the vehicle on the ramp to facilitate loading of the vehicle on to a truck.

BACKGROUND OF THE INVENTION

Recreational vehicles, including but not limited to snowmobiles, all terrain vehicles, motorcycles, garden tractors, and personal water craft, are often used in outdoor locations remote from the dwelling places of their riders. Accordingly, the need exists to transport the vehicles to the location of use. One means of transporting a recreational vehicle is by using a truck, for example a pickup truck, and loading the vehicle on to the bed of the truck. However, modern recreational vehicles are heavy, often in excess of 500 pounds, and usually require some type of vehicle loading means to assist the user in loading the vehicle on to the truck.

One example of a vehicle loading means is an inclined wooden ramp placed against the rear of the truck. The vehicle is then driven up the ramp on to the truck. A disadvantage of such a ramp is that there is little or no room left on the bed of the truck for storage of the ramp. The ramp is heavy and awkward to handle and to place in the correct position, and the ramp may be unsafe if positioned incorrectly. For these reasons and others, various pickup truck mounted apparatus have been developed to assist in the loading of recreational vehicles.

One example of such an apparatus is disclosed in U.S. Pat. No. 6,357,991 B1, issued Mar. 19, 2002. The apparatus comprises a tillable rail mechanism that may be lowered for loading a recreational vehicle, specifically a personal water craft. The tilting or pivoting of the rail mechanism operates on the same principle as a teeter-totter. As the vehicle is moved forwardly along the rails, the center of gravity shifts to tilt the mechanism, thereby raising the vehicle. To avoid abrupt movement of the rail mechanism, a pneumatic air cylinder is provided between a fixed member of the mechanism and the towing bar. The pneumatic cylinder extends to lower the rail mechanism and retracts to raise the rail mechanism. This allows for the controlled lowering and raising of the rail mechanism in response to the movement of the vehicle along the rails. The pneumatic cylinder is always operable and cannot be selectively operated to raise or lower the load. A disadvantage of this apparatus is that the pneumatic cylinder is sized and positioned for loading only vehicles of a certain weight and center of gravity, reducing the flexibility of the apparatus for loading a variety of types of vehicles. Another disadvantage is that there is no way to selectively release the pneumatic cylinder, making it difficult to tilt the mechanism to the lowered position when no vehicle is loaded.

Another example of a system for loading a recreational vehicle is disclosed in U.S. Pat. No. 5,380,141, issued Jan. 10, 1995. The system includes a frame member affixed to the transport vehicle, or truck, including rail means and platform means slidable along the rail means. The rail means is deployed rearwardly of the transport vehicle and tilted to load the recreational vehicle. A mechanical lifting means, specifically a winch attached to a vertical standard, is setup adjacent a rearward end of the rail means and connected to the rail means by a flexible steel cable. The lifting means is used to raise the rail means to a horizontal position and the platform with the recreational vehicle is then slid along the rail means for loading the vehicle on to the truck. A disadvantage of the system is that the lifting means is not mounted on the truck and must be setup on the ground in a stable manner each time the apparatus is used. Another disadvantage is that the frame member is affixed to the bed of the transport vehicle, requiring holes to be drilled through the metal bed that could lead to unsightly rust formation.

The need therefore still exists for a recreational vehicle loading and un-loading apparatus that is simple and safe to use with a variety of recreational vehicles.

SUMMARY OF THE INVENTION

According to an aspect of the invention, there is provided an apparatus for loading a recreational vehicle on to a truck, the truck having a front and rear and a longitudinal axis defined therebetween, the apparatus comprising: a vehicle receiving ramp that arcuately moves between a lowered position and a raised position, the ramp longitudinally mobile in the raised position between a rearmost longitudinal position and a foremost longitudinal position; a lifting means engaging the underside of the ramp, the lifting means selectively operable to arcuately move the ramp, the lifting means comprising a mounting means for mounting the lifting means to the rear of the pickup truck.

In one embodiment, the ramp is inclined with respect to the longitudinal axis when the ramp is in the lowered position and parallel with the longitudinal axis when the ramp is in the raised position. In another embodiment, the arcuate movement of the ramp can be independent of the longitudinal position of the ramp. In yet another embodiment, the arcuate movement of the ramp occurs at the rearmost longitudinal position of the ramp. In yet another embodiment, the mounting means is removably secured within a hitch means attached to the rear of the pickup truck. In yet another embodiment, the lifting means further comprises a selectively operable locking means for preventing longitudinal mobility of the ramp.

According to another aspect of the invention, there is provided an apparatus for loading a recreational vehicle on to a truck, the truck having a front and rear and a longitudinal axis defined therebetween, the apparatus comprising: a vehicle receiving ramp that arcuately moves between a lowered position that is inclined with respect to the longitudinal axis and a raised position that is parallel with the longitudinal axis, the ramp longitudinally mobile in the raised position between a rearmost longitudinal position and a foremost longitudinal position; a lifting means engaged with the underside of the ramp, the lifting means comprising: a jack mechanism; a scissors linkage engaged with the jack mechanism; a vertical support member forward of the scissors linkage; a pivot axis passing transversely through the vertical support member; and, a mounting means for removably mounting the lifting means to the rear of the pickup truck; wherein the jack mechanism is selectively operable to extend, thereby opening the scissors linkage to arcuately move the ramp from the lowered position to the raised position by pivoting the ramp about the pivot axis.

It will be understood by one skilled in the art that the invention may be used with a variety of types of vehicles having a cargo carrying bed, for example pickup trucks, flatbed trucks, vans, flatbed trailers, and the like. The embodiment of the invention described herein is with reference to a pickup truck, though the invention could be used in conjunction with any appropriate vehicle.

In the lowered position, the vehicle receiving ramp is inclined to receive the recreational vehicle. A variety of types of recreational vehicles may be loaded using the invention; for example, snowmobiles, all terrain vehicles, motorcycles, garden tractors, or personal watercraft. The vehicle may, for example, be driven on to the ramp under its own power, pushed on to the ramp, or pulled up the ramp by a cable passing over the forward end of the ramp. A winch may be used with the cable to assist in pulling the vehicle up the ramp.

When in the lowered position, the ramp is preferably locked in the rearmost longitudinal position to prevent longitudinal mobility of the ramp when the vehicle first makes contact with the ramp. To load the vehicle, the ramp and vehicle are arcuately moved to a raised position parallel with the longitudinal axis of the truck. Preferably, the ramp is then un-locked, the ramp and vehicle are moved longitudinally to the foremost longitudinal position, and the ramp is again locked. The longitudinal movement may occur independently of the arcuate movement of the ramp or simultaneously with the arcuate movement of the ramp. For example, to unload the vehicle, the ramp may be un-locked and moved to an intermediate longitudinal position prior to lowering the ramp. The inclination of the ramp then allows the ramp and vehicle to more easily longitudinally move to the rearmost longitudinal position. However, preferably the ramp and vehicle are moved to the rearmost longitudinal position and locked in the rearmost position prior to lowering the ramp as a safety precaution.

The ramp may preferably be locked in a pre-determined longitudinal position, for example, the foremost and rearmost longitudinal position, by a locking means. The locking means may, for example, comprise an elongated locking pin and a corresponding aperture on the underside of the ramp near the end of the ramp. The pin may be concentrically aligned with the aperture and translated into and out of engagement with the aperture to lock and un-lock the ramp, respectively. The pin may be unattached or may, preferably, be journaled to the lifting means to permit transverse translational movement of the pin. The pin is preferably biased towards the aperture, for example, by means of a spring. The locking means may be manually engaged or automatically engaged when the ramp reaches a desired pre-determined longitudinal position. For example, the automatic engagement may occur when the pin is aligned with the aperture and the spring biases the pin into engagement with the aperture. The locking means may optionally be engaged or disengaged remotely by an electric mechanism, for example a solenoid or electromagnet, or by a fluid powered mechanism, for example a hydraulic or pneumatic cylinder.

The ramp has longitudinal mobility along the length of the truck. The ramp may be moved longitudinally using rotational elements, for example wheels, engaged with the underside of the ramp. The wheels may be included with the ramp or with the lifting means. The movement of the vehicle along the ramp may be independent of the longitudinal movement of the ramp; for example, the ramp may comprise a series of evenly spaced parallel rollers. These rollers may be used to permit longitudinal movement of the vehicle, the ramp, or both.

The ramp is arcuately moved by selectively operating a lifting means engaged with the underside of the ramp. The lifting means may comprise a jack mechanism such as, for example, a hydraulic bottle jack, a screw jack, or a scissors jack. The jack mechanism may be selectively operated to extend or release by manually manipulating handles connected with the jack. Alternatively, the jack may be remotely operated by, for example, a fluid powered or electrically powered mechanism, such as a hydraulic or pneumatic cylinder, an electric screw, or an electric winch. The jack mechanism may be attached directly to the underside of the ramp or preferably connected to a linkage attached to the underside of the ramp. The linkage is used to increase the mechanical advantage of the lifting means and decrease the length of travel of the jack mechanism. Preferably, the linkage comprises a scissors linkage attached at one end to the underside of the ramp, at the other end to the mounting means, and connected to the jack at the fulcrum of the scissors.

The lifting means may also comprise a vertical support member forward of the linkage with a pivot axis passing transversely through the support member. The support member is preferably attached at the lower end to the mounting means and is preferably engaged at the upper end with the underside of the ramp. The ramp preferably arcuately about the pivot axis during operation of the lifting means.

The mounting means is attached to the rear of the truck. Preferably, the mounting means is engaged within a complementary aperture of a trailer hitch receiver attached to the rear of the truck. The mounting means may be removably secured within the hitch receiver by means of a bolt or a pin passing through the receiver and the mounting means. The mounting means may also include a conventional trailer hitch receiving aperture facing rearwardly to allow a trailer to be optionally towed behind the truck. Alternatively, the present invention may be mounted to the rear of the truck using brackets designed for attachment to the truck.

Further features of the invention will be described or will become apparent in the course of the following detailed description.

BRIEF DESCRIPTION OF THE DRAWINGS

In order that the invention may be more clearly understood, a preferred embodiment thereof will now be described in detail by way of example, with reference to the accompanying drawings, in which.

PREFERRED EMBODIMENT

Figure 1:
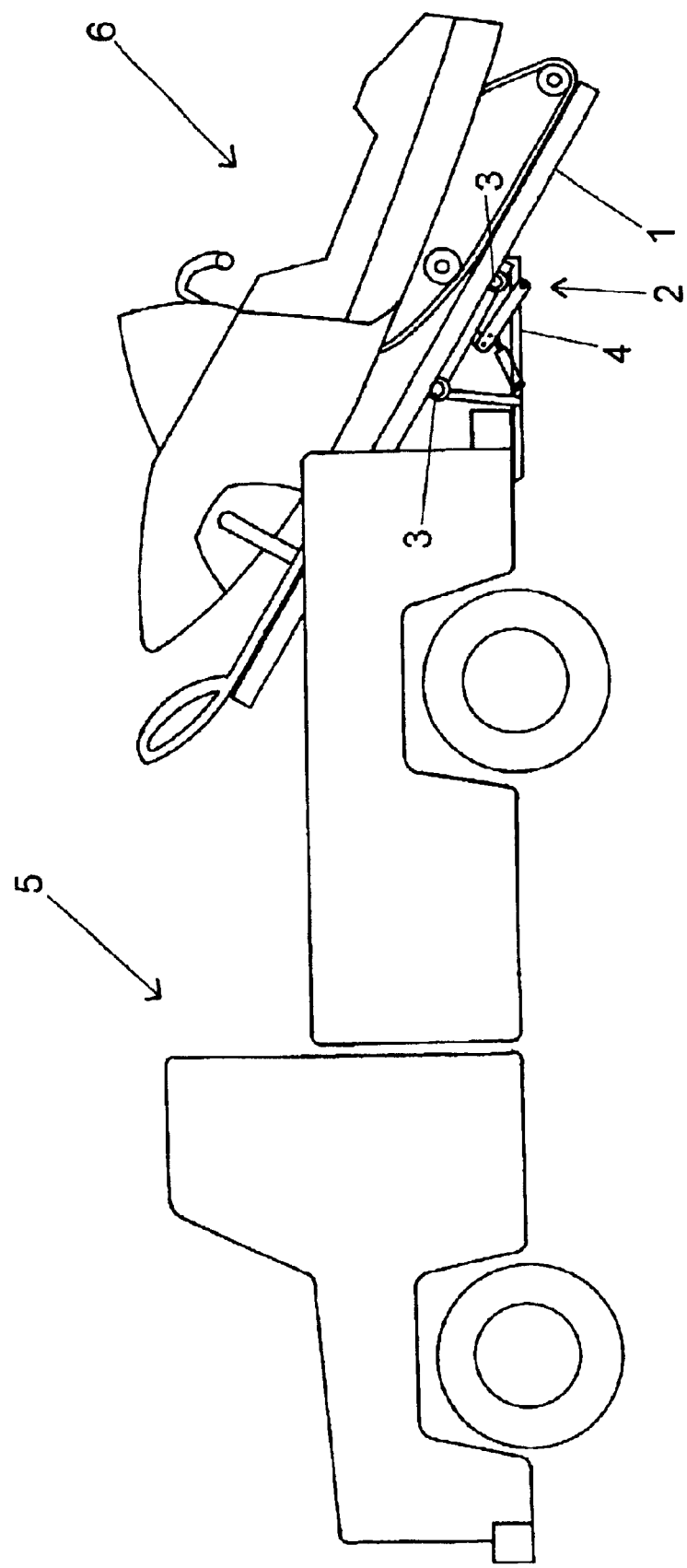
FIG. 1 is a side view of the present invention in the lowered position for loading a recreational vehicle.

Referring to FIG. 1, the present invention includes a ramp 1 and a lifting means 2. The lifting means comprises rotational elements, such as wheels 3, engaged with the underside of the ramp 1 and a mounting means 4 attached to the rear of a truck 5. The truck 5 is a pickup truck and has a front and rear and a longitudinal axis defined therebetween. The ramp 1 is shown in the lowered position and is inclined with respect to the longitudinal axis of the truck 5. A recreational vehicle, such as a snowmobile 6, is shown on the ramp.

Figure 2:
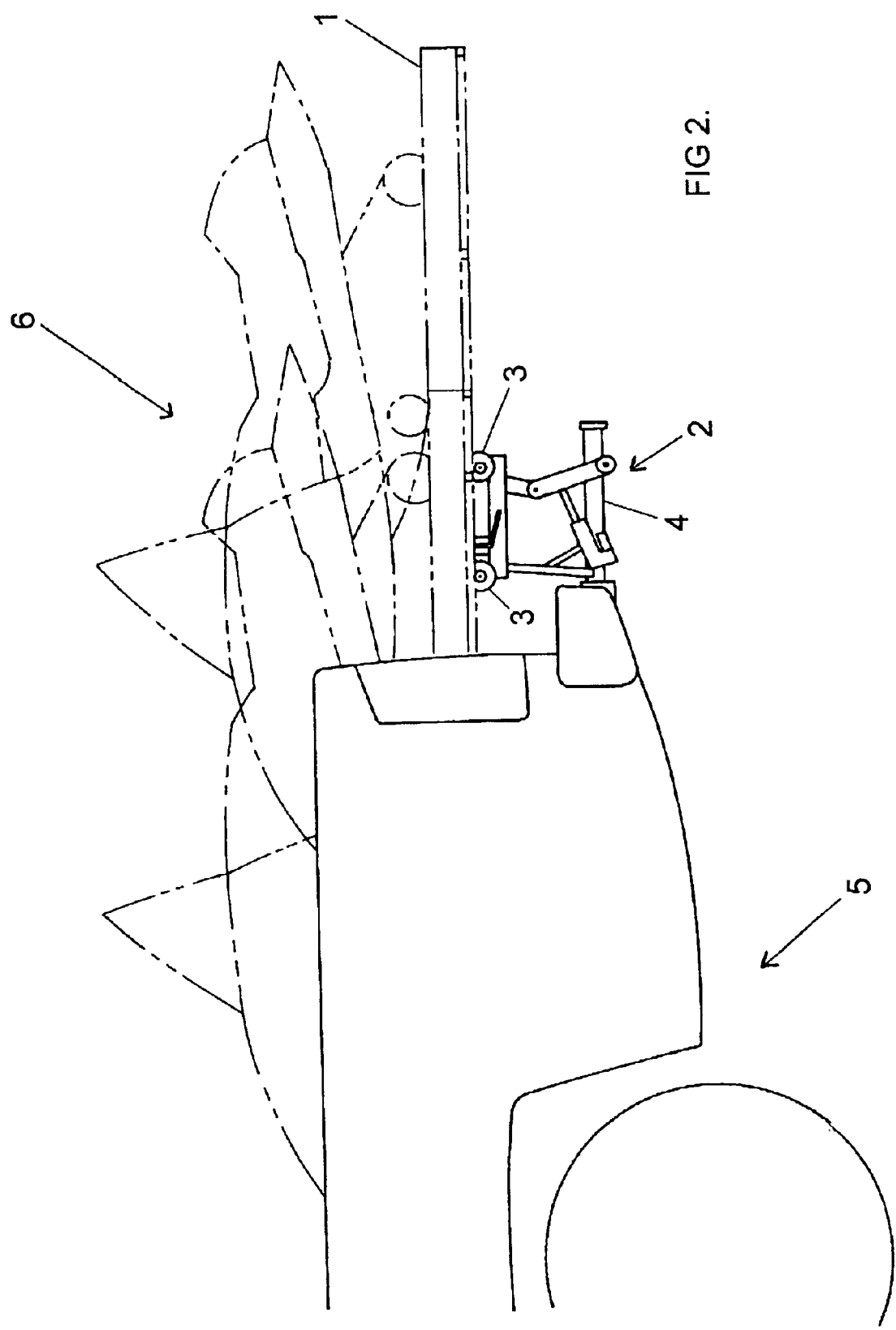
FIG. 2 is a side view of the present invention in the raised position for longitudinal movement of the recreational vehicle on to the truck.

Referring now to FIG. 2, to load the recreational vehicle 6 the ramp 1 is arcuately moved to the raised position parallel with the longitudinal axis of the truck 5 using the lifting means 2 in a manner that will be more thoroughly described hereinafter. The ramp 1 may then preferably be unlocked and longitudinally moved from the rearmost longitudinal position to the foremost longitudinal position by translating the ramp along the wheels 3. The ramp 1 is then preferably locked in the foremost position to prevent undesirable rearward movement of the ramp while driving the truck. To unload the recreational vehicle, the ramp is preferably unlocked, longitudinally moved to the rearmost longitudinal position, locked in the rearmost longitudinal position, and lowered to the inclined position for subsequent removal of the vehicle.

Figure 3:
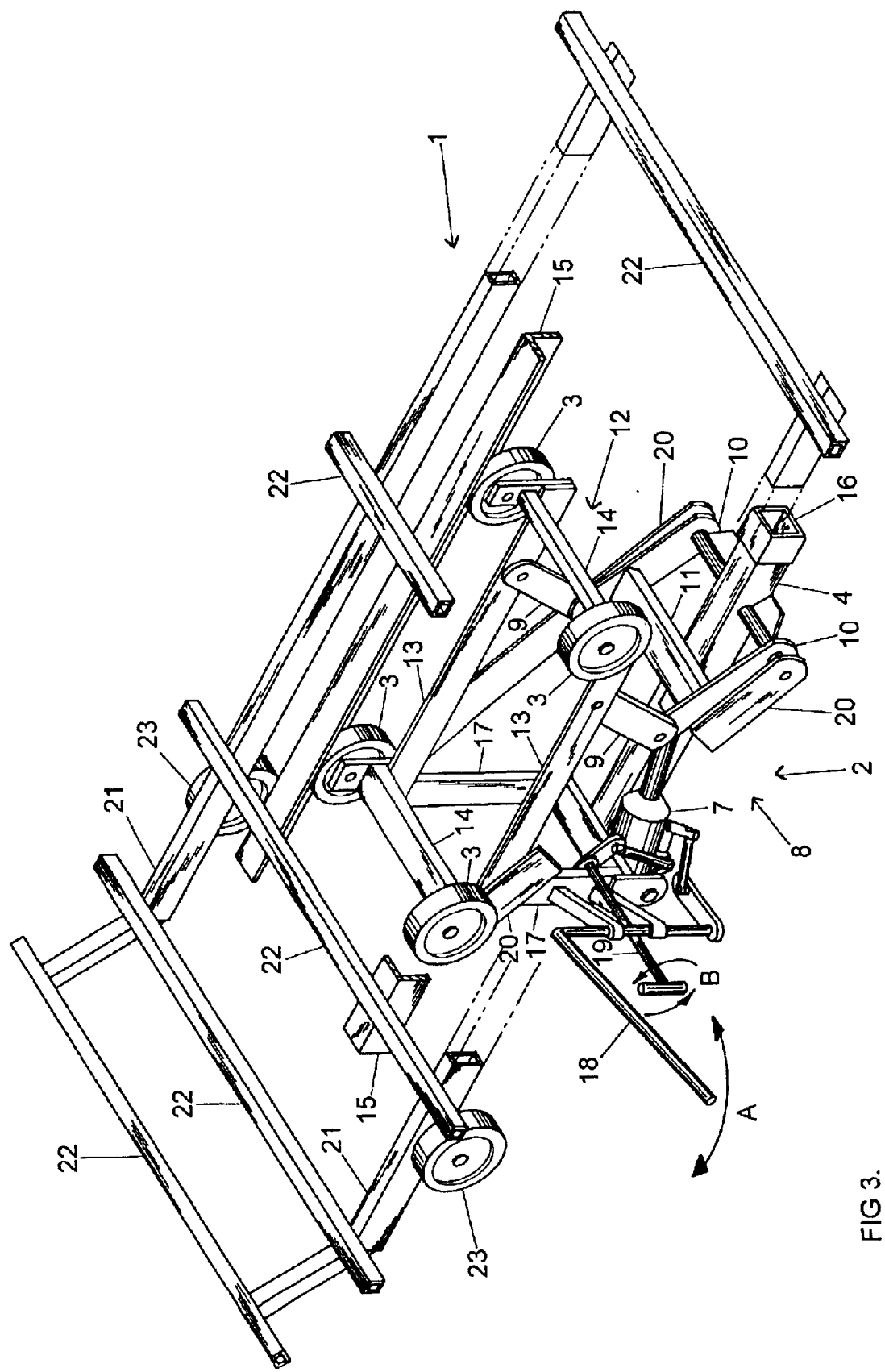
FIG. 3 is a perspective view of an embodiment of the lifting means of the present invention; and, FIG. 4 is a perspective view of an embodiment of the locking means of the present invention.

Referring now to FIG. 3, the lifting means 2 comprises, for example, a hydraulic bottle jack 7. The jack 7 is pivotally attached at one end to the mounting means 4 and at the other end to a scissors linkage 8. The linkage 8 comprises upper linkage members 9, lower linkage members 10, and a transverse linkage member 11. The upper and lower linkage members 9, 10 are pivotally attached to one another at the fulcrum of the scissors linkage 8. The transverse linkage member 11 joins each lower linkage member 10 near the fulcrum. The jack 7 is pivotally attached to the transverse linkage member 11 so that the jack may be selectively operated to extend, causing the scissors linkage 9 to open, thereby raising the ramp 1. The linkage 8 increases the mechanical advantage of the lifting means 2 and allows the jack 7 to have a relatively short stroke.

The upper linkage members 9 are pivotally attached to the lifting frame 12 of the lifting means 2. The lifting frame 12 comprises longitudinal frame members 13 and transverse frame members 14, preferably attached to one another to form a rectangle. The upper linkage members 9 are preferably attached to the longitudinal frame members 13. A wheel 3 is rotationally attached to each corner of the rectangle with the radius of each wheel projecting above the lifting frame 12. The wheels 3 on each side of the rectangle are longitudinally aligned. The ramp 1 includes a pair of parallel rail members 15 attached to the underside thereof and longitudinally aligned therewith. Each rail member 15 preferably has two surfaces at right angles to each other, one of the surfaces parallel to the underside of the ramp 1 for engagement with the circumference of two of the longitudinally aligned wheels 3 while the other surface of the rail member is adjacent the side of the wheels. Longitudinal movement of the ramp 1 causes rotation of the wheels 3 while the rail members 15 prevent mis-alignment of the ramp.

The lower linkage members 10 are each pivotally attached to the mounting means 4. The mounting means 4 preferably comprises a hollow rectangular or square tube corresponding in size to a standard truck hitch receiver. The hitch receiver (not shown) is mounted to the underside of the truck 5 at the rear thereof along the longitudinal centerline. The mounting means 4 is preferably inserted within the truck hitch receiver and removably secured therein by means of an elongated pin (not shown) passing through both the mounting means and the hitch receiver. Withdrawal of the pin thereby permits the entire apparatus to be readily and easily removed from the truck 5. The mounting means 4 may include a mounting flange 16 at the rear thereof that forms an opening for receiving a standard trailer hitch, thereby permitting a trailer to be towed behind the truck 5 while the apparatus of the present invention is in use.

The lifting means 2 further comprises vertical support members 17 forward of the scissors linkage 8. Each vertical support member 17 is attached at its lower end to the mounting means 4 and pivotally attached at its upper end to the lifting frame 12. A transverse pivot axis passes through the vertical support members 17 at the point of attachment to the lifting frame 12. To selectively operate the lifting means 2 to raise the ramp 1, the lift handle 18 is actuated with a reciprocating rotational motion, as indicated by the arrow A. This causes the jack 7 to extend, opening the scissors linkage 8. The lifting frame 12 then upwardly arcuately moves about the pivot axis, raising the ramp 1. To lower the ramp 1, the lifting means 2 is selectively operated using the release handle 19, which is rotated in the direction indicated by the arrows B. This releases the jack 7, allowing the scissors linkage 8 to close and the lifting frame 12 to downwardly arcuately move about the pivot axis.

The lifting means 2 further comprises cross members 20 on both sides of the lifting means. The cross members 20 are each pivotally attached to the mounting means 4 and one of the vertical support members 17 to increase the structural strength of the lifting means 2.

The ramp 1 comprises longitudinal ramp frame members 21 and transverse ramp frame members 22. The surface (not shown) of the ramp 1 is preferably a continuous sheet of material and may optionally be perforated to permit debris associated with the recreational vehicle to pass through the ramp. A set of ramp wheels 23 is preferably attached at the front of the ramp 1 for engagement with the bed of the truck 5 to facilitate longitudinal movement of the ramp.

Figure 4:
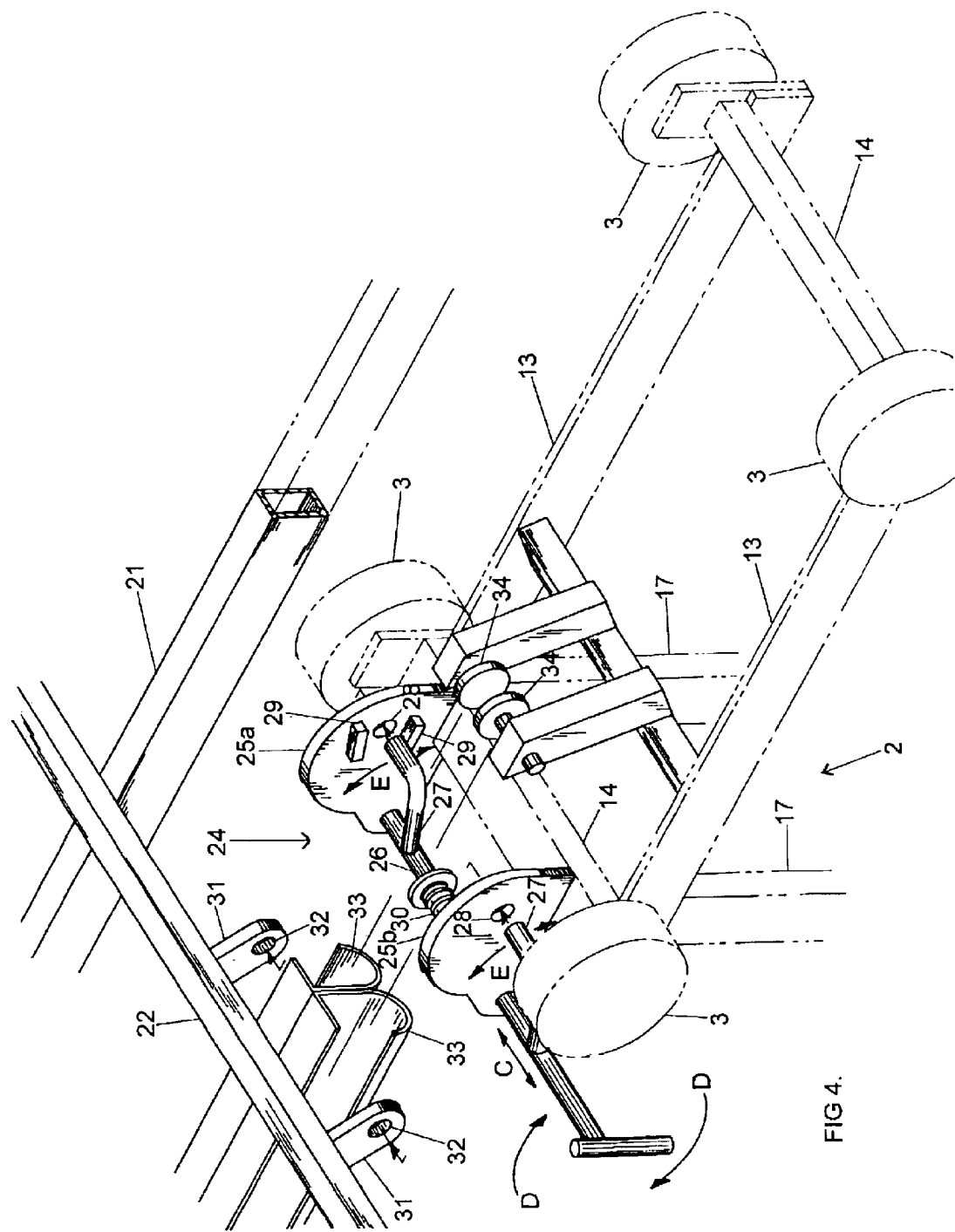

Referring to FIG. 4, the lifting means 2 further comprises a locking means 24. The locking means 24 preferably comprises a pair of parallel lock flanges 25a, 25b perpendicularly attached to the forward transverse frame member 14. An elongated locking pin 26 has a portion journaled by the flanges to permit transverse translational movement as indicated by the arrow C. The locking pin 26 comprises a pair of right-angled pin extensions 27. Each pin extension 27 has a transverse portion parallel with the journaled portion that is radially offset therefrom. The transverse portion of the pin extension 27 may be selectively concentrically aligned with a corresponding lock aperture 28 in each lock flange 25a, 25b. This alignment is effected by rotation of the locking pin 26 in the direction indicated by arrow D, causing a corresponding rotation of the pin extension 27 in the direction indicated by arrow E. Abutment tabs 29 on lock flange 25a constrain the rotation of the pin extension 27 within a working range. The locking pin 26 passes through a spring 30 that is compressed against lock flange 25b to bias the pin extension 27 towards the lock aperture 28.

Downwardly depending from one of the transverse ramp frame members 22 at both the front and rear of the ramp 1 are a pair of pin receiving flanges 31. The pin receiving flanges 31 each have a pin receiving aperture 32 with a diameter corresponding to the pin extensions 27. The pin receiving flanges 31 have a face parallel with the lock flanges 25a, 25b that may be placed adjacent the lock flanges on the side opposite the pin extension 27. Longitudinal movement of the ramp 1 to either the foremost or rearmost longitudinal position concentrically aligns the pin receiving aperture 32 and the lock aperture 28. Upon subsequent concentric alignment of the pin extension 27 and the apertures 32 and 28, the spring 30 biases the pin extension into engagement with both of the apertures, thereby locking the ramp in position. To unlock the ramp, the locking pin 26 is translated against the bias of the spring 30 to withdraw the pin extensions 27 from the aligned apertures 32 and 28, thereby permitting the ramp to longitudinally move.

Attached to the underside of the ramp 1 along the longitudinal centerline thereof are a pair of back-to-back J-shaped guide channels 33. A pair of guide wheels 34 are mounted to the lifting frame 12 and aligned with the guide channels 33 to prevent the ramp from being inadvertently vertically removed from the lifting means 2. The guide channels 33 and guide wheels 34 are especially useful when installing the ramp 1 on the lifting means 2 as an aid in longitudinally aligning the ramp, as the wheels 3 may not initially be fully engaged with the rails 15.

Other advantages which are obvious and which are inherent to the structure will be evident to one skilled in the art and are anticipated by the present invention.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having described the invention, what is claimed is:

1. An apparatus for loading a recreational vehicle on to a truck, the truck having a front and rear and a longitudinal axis defined therebetween, the apparatus comprising:
   a) a vehicle receiving ramp that arcuately moves between a lowered position and a raised position, the ramp longitudinally mobile in the raised position between a rearmost longitudinal position and a foremost longitudinal position;
   b) a lifting means engaging the underside of the ramp, the lifting means selectively operable to arcuately move the ramp, the lifting means comprising a vertical support member with a pivot axis passing transversely therethrough, and a mounting means for mounting the lifting means to the rear of the pickup truck.

2. The apparatus of claim 1, wherein the ramp is inclined with respect to horizontal when the ramp is in the lowered position and parallel with horizontal when the ramp is in the raised position.

3. The apparatus of claim 1, wherein the lifting means is selectively operable to extend, thereby arcuately moving the ramp from the lowered position to the raised position.

4. The apparatus of claim 1, wherein the lifting means comprises a jack mechanism.

5. The apparatus of claim 1, wherein the lifting means further comprises a scissors linkage.

6. The apparatus of claim 1, wherein the ramp arcuately moves about the pivot axis.

7. The apparatus of claim 1, wherein the lifting means includes rotational elements for engagement with the underside of the ramp to facilitate longitudinal mobility of the ramp along the lifting means.

8. The apparatus of claim 1, wherein arcuate movement of the ramp can be independent of the longitudinal position of the ramp.

9. The apparatus of claim 8, wherein the arcuate movement of the ramp occurs at the rearmost longitudinal position of the ramp.

10. The apparatus of claim 1, wherein the arcuate movement of the ramp occurs at the rearmost longitudinal position of the ramp.

11. The apparatus of claim 1, wherein the lifting means is selectively operable to release, thereby arcuately moving the ramp from the raised position to the lowered position.

12. The apparatus of claim 1, wherein the mounting means is removably secured within a hitch means attached to the rear of the pickup truck.

13. The apparatus of claim 1, wherein the lifting means further comprises a selectively operable locking means for preventing longitudinal mobility of the ramp.

14. The apparatus of claim 13 wherein the locking means locks the ramp in either the foremost longitudinal position or the rearmost longitudinal position.

15. The apparatus of claim 13, wherein the locking means comprises: an elongated locking pin journaled to the lifting means; an aperture corresponding to the pin and concentrically aligned therewith, the aperture located on the underside of the ramp near the end of the ramp; and, wherein the pin is translatable transversely between an un-locked position and a locked position, the pin engaged within the aperture in the locked position.

16. The apparatus of claim 1, wherein the ramp is longitudinally mobile with respect to the lifting means along the lifting means.

17. An apparatus for loading a recreational vehicle on to a truck, the truck having a front and rear and a longitudinal axis defined therebetween, the apparatus comprising:
   a) a vehicle receiving ramp that arcuately moves between a lowered position that is inclined with respect to the longitudinal axis and a raised position that is parallel with the longitudinal axis, the ramp longitudinally mobile in the raised position between a rearmost longitudinal position and a foremost longitudinal position;
   b) a lifting means engaged with the underside of the ramp, the lifting means comprising: a jack mechanism; a scissors linkage engaged with the jack mechanism; a vertical support member forward of the scissors linkage; a pivot axis passing transversely through the vertical support member; and, a mounting means for removably mounting the lifting means to the rear of the truck;
   c) wherein the jack mechanism is selectively operable to extend, thereby opening the scissors linkage to arcuately move the ramp from the lowered position to the raised position by pivoting the ramp about the pivot axis.

18. An apparatus for loading a recreational vehicle on to a truck, the truck having a front and rear and a longitudinal axis defined therebetween, the apparatus comprising:
   a) a vehicle receiving ramp that arcuately moves between a lowered position and a raised position, the ramp longitudinally mobile in the raised position between a rearmost longitudinal position and a foremost longitudinal position;
   b) a lifting means engaging the underside of the ramp, the lifting means selectively operable to arcuately move the ramp, the lifting means comprising a locking means comprising: an elongated locking pin journaled to the lifting means; an aperture corresponding to the pin and concentrically aligned therewith, the aperture located on the underside of the ramp near the end of the ramp; and, wherein the pin is translatable transversely between an un-locked position and a locked position, the pin engaged within the aperture in the locked position.

19. The apparatus of claim 18, wherein the locking means is selectively operable to prevent longitudinal mobility of the ramp.

20. The apparatus of claim 18, wherein the locking means locks the ramp in either the foremost longitudinal position or the rearmost longitudinal position.

* * * * *